US011827099B2

(12) United States Patent
Maeda et al.

(10) Patent No.: US 11,827,099 B2
(45) Date of Patent: Nov. 28, 2023

(54) AUTOMOBILE

(71) Applicant: TOYOTA JIDOSHA KABUSHIKI KAISHA, Toyota (JP)

(72) Inventors: Tomoharu Maeda, Toyota (JP); Takeshi Yasuda, Kuwana (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 112 days.

(21) Appl. No.: 17/563,529

(22) Filed: Dec. 28, 2021

(65) Prior Publication Data

US 2022/0234443 A1    Jul. 28, 2022

(30) Foreign Application Priority Data

Jan. 25, 2021    (JP) ................... 2021-009289

(51) Int. Cl.
*B60K 35/00*    (2006.01)
*G06T 11/20*    (2006.01)

(52) U.S. Cl.
CPC ............ *B60K 35/00* (2013.01); *G06T 11/203* (2013.01); *B60K 2370/152* (2019.05); *B60K 2370/167* (2019.05); *B60K 2370/52* (2019.05)

(58) Field of Classification Search
CPC .............. B60K 35/00; B60K 2370/167; B60K 2370/152; B60K 2370/52; G06T 11/203
See application file for complete search history.

(56) References Cited

U.S. PATENT DOCUMENTS

| | | | |
|---|---|---|---|
| 2011/0224898 A1* | 9/2011 | Scofield | G08G 1/0104 701/532 |
| 2017/0205248 A1* | 7/2017 | Lei | G01C 21/3676 |
| 2018/0105186 A1* | 4/2018 | Motomura | B60W 50/14 |
| 2019/0033855 A1* | 1/2019 | Mathe | B60W 50/10 |
| 2020/0191588 A1* | 6/2020 | Park | G08G 1/096775 |
| 2022/0340166 A1* | 10/2022 | Kume | G08G 1/0962 |
| 2023/0043713 A1* | 2/2023 | Sakurai | B60K 37/02 |

FOREIGN PATENT DOCUMENTS

JP    2009-248574 A    10/2009

* cited by examiner

*Primary Examiner* — Doon Y Chow
(74) *Attorney, Agent, or Firm* — Finnegan, Henderson, Farabow, Garrett & Dunner, LLP

(57) ABSTRACT

An automobile includes: a traveling road information storage device that stores traveling road information; a traveling position detection device that detects a traveling position of a vehicle; a display device that displays an image in front of a driver; and a control device that controls the display device such that the display device displays an image of a traveling line in front of the driver, based on the traveling position and the traveling road information. The control device controls the display device such that the display device displays the image of the traveling line by switching among traveling lines corresponding to a plurality of traveling patterns. It is possible to display the image of a traveling line depending on a traveling road or driver's need, by switching to a traveling pattern based on the traveling road or driver's need.

6 Claims, 3 Drawing Sheets

AUTOMOBILE

CROSS-REFERENCE TO RELATED APPLICATION

This application claims priority to Japanese Patent Application No. 2021-009289 filed on Jan. 25, 2021, incorporated herein by reference in its entirety.

BACKGROUND

1. Technical Field

The present disclosure relates to an automobile, and more specifically, to an automobile including a display device that can display an image of a traveling line in front of a driver.

2. Description of Related Art

Conventionally, as this kind of automobile, there has been proposed an automobile including a head-up display that displays an image on a windshield (see Japanese Unexamined Patent Application Publication No. 2009-248574, for example). This automobile displays a planned traveling line of wheels of the automobile on the windshield, and thereby can cause a driver to recognize the planned traveling line of the wheels easily and clearly.

SUMMARY

In this kind of automobile, it is possible that an image of a previously set ideal traveling line is displayed on the windshield at the time of traveling on a traveling road. However, a desired traveling line differs depending on the traveling road or driver's taste. Therefore, with only the previously set ideal traveling line, it is not possible to display an image of a traveling line depending on the traveling road or an image of a traveling line depending on driver's need.

An automobile in the present disclosure has a main object to display the image of the traveling line depending on the traveling road or driver's need.

The automobile in the present disclosure adopts the following means for achieving the above-described main object.

An automobile in the present disclosure is
an automobile including:
a traveling road information storage device that stores traveling road information;
a traveling position detection device that detects a traveling position of a vehicle;
a display device that displays an image in front of a driver; and
a control device that controls the display device such that the display device displays an image of a traveling line in front of the driver, based on the traveling position and the traveling road information, in which
the control device controls the display device such that the display device displays the image of the traveling line by switching among traveling lines corresponding to a plurality of traveling patterns.

In the automobile in the present disclosure, when the display device is controlled such that the display device displays the image of the traveling line in front of the driver based on the traveling position and the traveling road information, the display device is controlled such that the display device displays the image of the traveling line by switching among the traveling lines corresponding to the plurality of traveling patterns. It is possible to display the image of the traveling line depending on the traveling road or driver's need, by switching to the traveling pattern based on the traveling road or driver's need.

In the automobile in the present disclosure, the control device may control the display device such that the display device displays an image of a traveling line corresponding to a traveling pattern selected by a driver, the traveling pattern selected by the driver being included in the plurality of traveling patterns. Thereby, it is possible to display the image of the traveling line desired by the driver.

In the automobile in the present disclosure, the traveling road information may include information about a particular traveling road, the plurality of traveling patterns may include traveling patterns of a plurality of particular drivers when the plurality of particular drivers drive on the particular traveling road, and the control device may control the display device such that the display device displays an image of a traveling line corresponding to a traveling pattern of a particular driver selected by a driver, in traveling on the particular traveling road, the traveling pattern of the particular driver selected by the driver being included in the traveling patterns of the plurality of particular drivers. Thereby, in the traveling on the particular traveling road, it is possible to display the image of the traveling line corresponding to the traveling pattern of the particular driver selected by the driver.

In the automobile in the present disclosure, the traveling pattern may include at least one of a braking timing, a steering start timing and a gear shifting timing, and the control device may control the display device such that the display device displays an image of at least one of the braking timing, the steering start timing and the gear shifting timing together with the image of the traveling line. Thereby, it is possible to perform a braking operation, a steering operation or a gear shifting operation at the braking timing, the steering start timing or the gear shifting timing.

The automobile in the present disclosure may include an automatic driving device that performs automatic driving control, in which the automatic driving device performs the automatic driving control such that the vehicle travels along a displayed traveling line, when automatic driving is selected. Thereby, it is possible to travel along the traveling line corresponding to the selected traveling pattern by the automatic driving.

In the automobile in the present disclosure, the control device may permit the display of the image of the traveling line when the vehicle travels on a predetermined traveling road, and may prohibit the display of the image of the traveling line when the vehicle travels on a traveling road other than the predetermined traveling road. Thereby, it is possible to display the image of the traveling line, only on the predetermined traveling road. Examples of the predetermined traveling road include a traveling road isolated from general roads, as exemplified by a circuit, and a particular expressway.

In the automobile in the present disclosure, the control device may control the display device such that the display device displays an image of a traveling line corresponding to a traveling pattern for a road condition, the traveling pattern for the road condition being included in the plurality of traveling patterns. Thereby, it is possible to display the image of the traveling line corresponding to the traveling pattern for the road condition.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with use of an embodiment.

Figure 1:
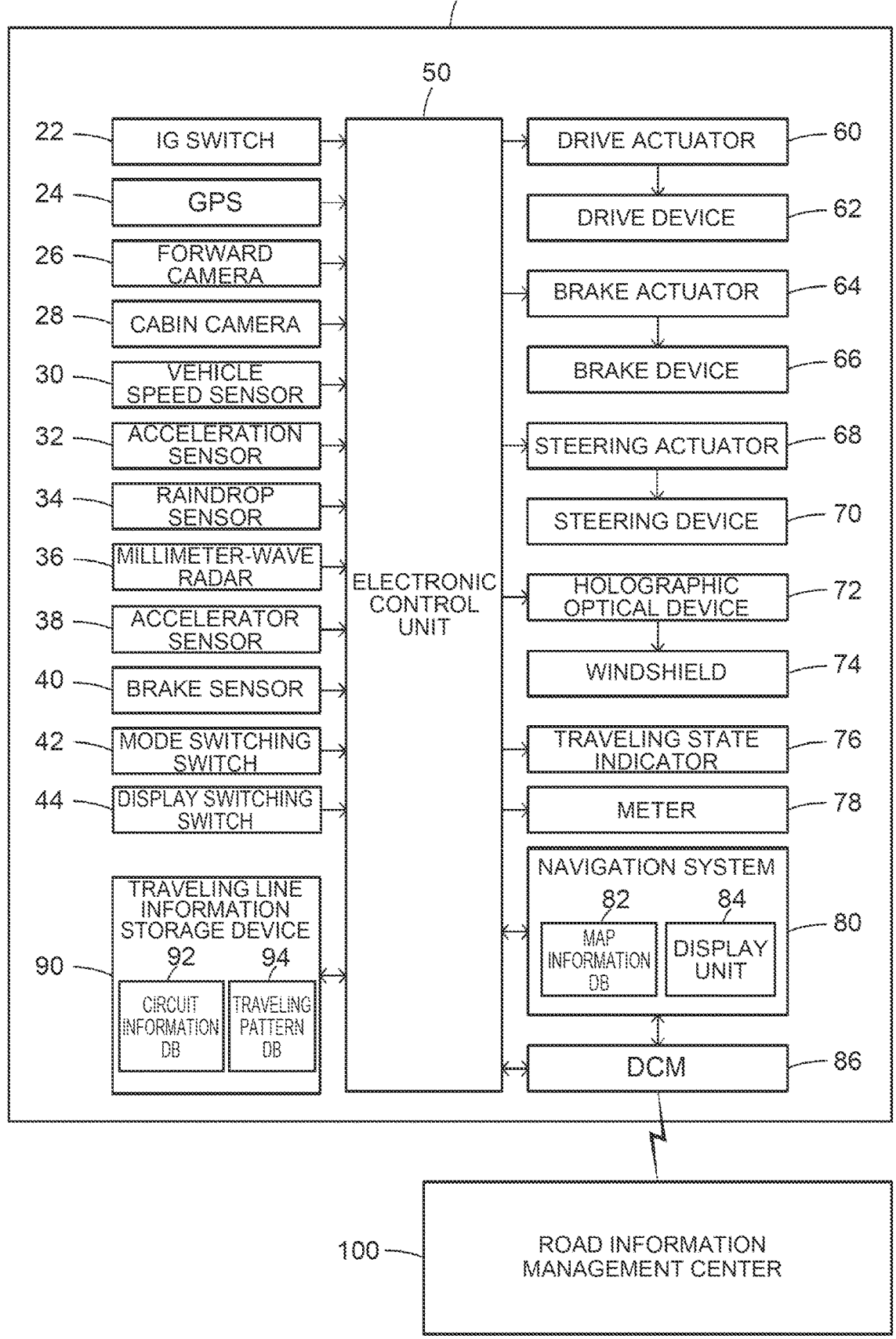
FIG. 1 is a block diagram showing an exemplary configuration of an automobile 20 according to an embodiment of the present disclosure, as blocks mainly including an electronic control unit 50.

FIG. 1 is a block diagram showing an exemplary configuration of an automobile 20 according to an embodiment of the present disclosure, as blocks mainly including an electronic control unit 50. As illustrated, the automobile 20 according to the embodiment is configured as an automobile that travels using dynamic power from a drive device 62 such as a motor or an engine.

In addition to the drive device 62, the automobile 20 according to the embodiment includes an ignition switch 22, a global positioning system (global positioning satellite, GPS) 24, a forward camera 26, a cabin camera 28, a vehicle speed sensor 30, an acceleration sensor 32, a raindrop sensor 34, a millimeter-wave radar 36, an accelerator sensor 38, a brake sensor 40, a mode switching switch 42, a display switching switch 44, the electronic control unit 50, a drive actuator 60, a brake actuator 64, a brake device 66, a steering actuator 68, a steering device 70, a holographic optical device 72, a windshield 74, a traveling state indicator 76, a meter 78, a navigation system 80, a data communication module (DCM) 86, a traveling line information storage device 90, and the like.

The GPS 24 is a device that detects the position of a vehicle based on signals sent from a plurality of GPS satellites. The forward camera 26 is a camera that is attached to an upper portion at a front center in an occupant cabin and that is disposed so as to photograph a forward view through the windshield 74. The cabin camera 28 is a camera that is attached to an upper portion at the front center in the occupant cabin and that is disposed so as to photograph the interior of the occupant cabin. The vehicle speed sensor 30 detects the vehicle speed of the vehicle based on a wheel speed or the like. For example, the acceleration sensor 32 detects the acceleration of the vehicle in the front-rear direction of the vehicle, and detects the acceleration of the vehicle in the right-left direction (lateral direction) of the vehicle. The raindrop sensor 34 is a sensor that detects a raindrop on the windshield. The millimeter-wave radar 36 detects the inter-vehicle distance and relative speed between the own vehicle and a forward vehicle, and detects the inter-vehicle distance and relative speed between the own vehicle and a rearward vehicle.

The accelerator sensor 38 detects an accelerator operation amount or the like corresponding to the amount of stepping of an accelerator pedal by a driver. The brake sensor 40 detects a brake position or the like as the amount of stepping of a brake pedal by the driver. The mode switching switch 42 is a switch that is disposed near a steering wheel at a driver's seat and that is used for switching between a manual driving mode and an automatic driving mode. The display switching switch 44 is a switch for switching between display and non-display of an image (hologram) of a traveling line corresponding to a selected traveling pattern in front of the driver.

The drive device 62 includes a motor, an engine or the like for traveling, and is driven and controlled by the drive actuator 60.

The electronic control unit 50 is configured as a microcomputer mainly including a CPU, which is not illustrated, and in addition to the CPU, includes a ROM, a RAM, a flash memory, an input port, an output port, a communication port and the like. Depending on the traveling mode from the mode switching switch 42, the electronic control unit 50 sets a required torque to be output from the drive device to a drive shaft to which drive wheels are joined, a required braking force to be output from the brake device, and the like, based on the accelerator operation amount from the accelerator sensor 38, the brake position from the brake sensor 40, and the like.

In the manual driving mode, the electronic control unit 50 sets the required torque and the required braking force, based on the accelerator operation amount from the accelerator sensor 38, the brake position from the brake sensor 40 and the vehicle speed from the vehicle speed sensor 30. Then, the electronic control unit 50 sends the set required torque to the drive actuator 60, and sends the set required braking force to the brake actuator 64. In the automatic driving mode, the electronic control unit 50 sets a target traveling state of the vehicle based on map information from the navigation system 80, road information obtained from a road information management center 100, peripheral information obtained from the millimeter-wave radar 36, the forward camera 26 and the like, and other information, and sets the required torque, the required braking force, a target steering position and the like, such that the set target traveling state is obtained. Then, the electronic control unit 50 sends the set required torque to the drive actuator 60, sends the set required braking force to the brake actuator 64, and sends the target steering position to the steering actuator 68.

The drive actuator 60 drives and controls the drive device 62 such that the required torque set by the electronic control unit 50 is output from the drive device 62 to the drive shaft.

The brake actuator 64 controls the brake device 66 such that the brake device 66 applies the required braking force set by the electronic control unit 50 to the vehicle.

The steering actuator 68 drives and controls the steering device 70 such that the steering position of the steering device 70 becomes the target steering position set by the electronic control unit 50.

The holographic optical device 72 is configured as an augmented reality (AR) device that displays various holograms on the windshield 74, and is built in a dashboard of the vehicle.

The data communication module (DCM) 86 sends information about the own vehicle to the road information management center 100, and receives road traffic information from the road information management center 100. Examples of the information about the own vehicle include the position, vehicle speed, traveling power and traveling mode of the own vehicle. Examples of the road traffic information include information relevant to a current or future congestion, information relevant to a current average vehicle speed or a predicted value of a future average vehicle speed in a section on a traveling route, information relevant to traffic regulation, information relevant to weather, information relevant to a road surface state, and information relevant to a map. The DCM 86 communicates with the road information management center 100 at a predetermined interval (for example, a 30-second interval, a 1-minute interval or a 2-minute interval).

The navigation system 80 is a system that guides the own vehicle to a set destination, and includes a map information database 82 and a display unit 84. In the map information database 82, the road pavement state of a road, the width of a road, the number of lanes, the width of a sidewalk, a direction in which the vehicle can travel, a legal speed limit and the like are stored for each section, as the map information. The navigation system 80 communicates with the road information management center 100 through the data communication module (DCM) 86. When the destination is set, the navigation system 80 sets a route based on information about the destination, information about a current place (a current position of the own vehicle) acquired by the GPS 24, and information stored in the map information database 82. Then, the navigation system 80 communicates with the road information management center 100 at a predetermined time interval (for example, a 3-minute interval or a 5-minute interval), to acquire the road traffic information, and performs route guidance based on the road traffic information.

The traveling line information storage device 90 is a storage device that stores information necessary to display holograms (images) of traveling lines corresponding to various traveling patterns on the windshield 74 using the holographic optical device 72, and includes a circuit information database 92 and a traveling pattern database 94. In the circuit information database 92, information (forms of courses, states of traveling roads, widths of traveling roads, positions on the map, and the like) about circuits located in various places are stored. The traveling pattern database 94 includes traveling patterns (particular-driver traveling patterns) of a plurality of particular drivers such as famous F1 drivers and rally drivers, an advanced-driver traveling pattern, an intermediate-driver traveling pattern, a beginning-driver traveling pattern, a recommended traveling pattern, and the like. The particular-driver traveling pattern includes a traveling line for a particular driver in each circuit, a driver's sight point, a braking start point, a steering start point, a gear shifting point, and the like. Further, the particular-driver traveling pattern includes a traveling line, a driver's sight point, a braking start point, a steering start point, a gear shifting point and the like at the time the fastest lap time of a particular driver in each circuit. In the advanced-driver traveling pattern, the intermediate-driver traveling pattern or the beginning-driver traveling pattern, for example, a traveling line at a corner is set so as to be a traveling line of out-in-out, a traveling line of out-in-in or a traveling line of in-in-in. In the recommended traveling pattern, an ideal traveling line that is likely to be the safest traveling is set.

Figure 2:
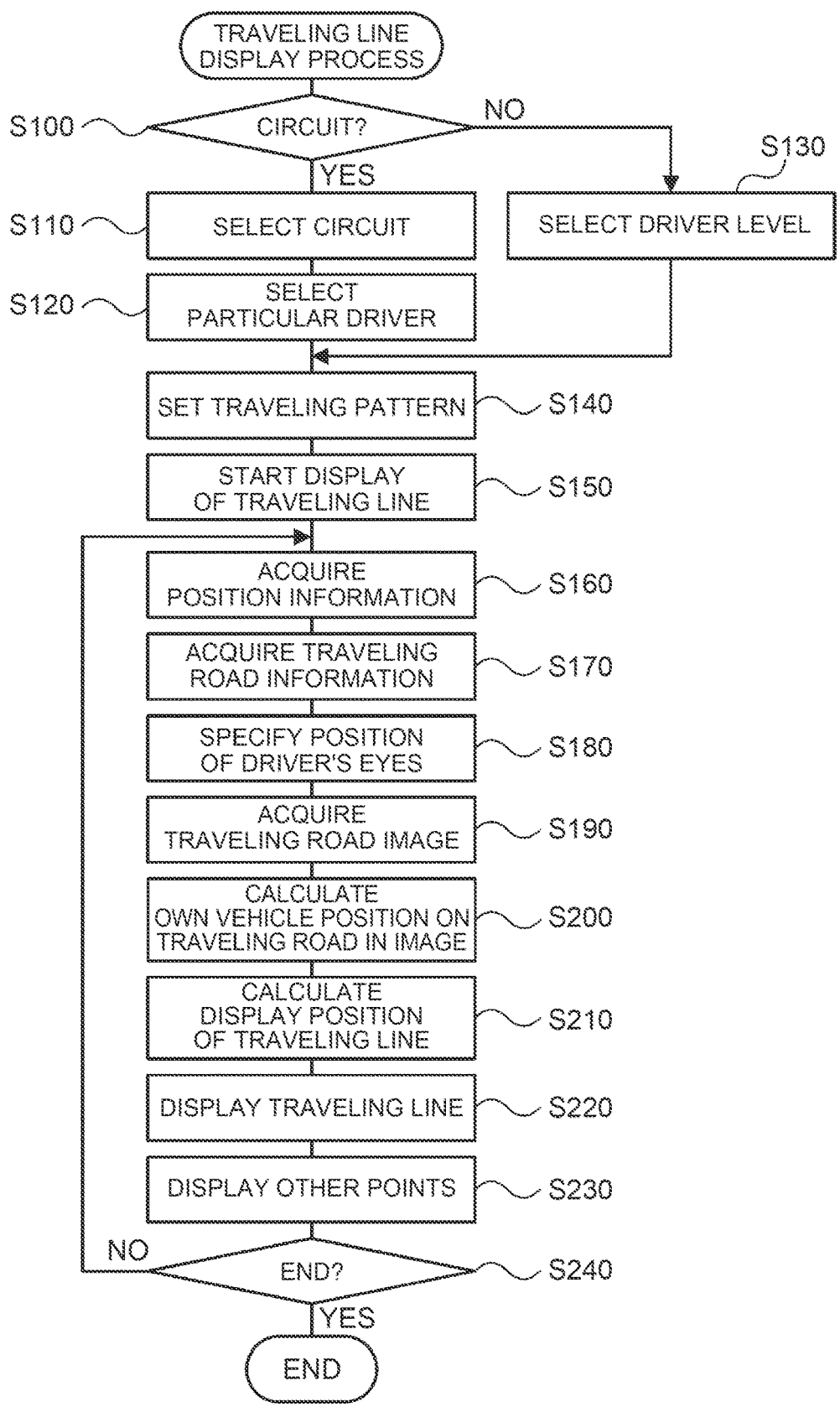
FIG. 2 is a flowchart showing an exemplary traveling line display process that is executed by the electronic control unit 50.

Next, a behavior of the automobile 20 configured as described above, particularly, a behavior for displaying the traveling line will be described. FIG. 2 is a flowchart showing an exemplary traveling line display process that is executed by the electronic control unit 50. The traveling line display process is executed when the display switching switch 44 is switched to the display of the traveling line.

When the traveling line display process is executed, first, the electronic control unit 50 requests selection of whether the traveling road is a circuit (step S100). This request can be performed, for example, by displaying icons of "circuit" and "general road" on the display unit 84 of the navigation system 80 and causing the driver to touch one of the icons.

When "circuit" is selected in step S100, the driver selects a circuit for traveling, from the circuits stored in the circuit information database 92 of the traveling line information storage device 90 (step S110), and selects a particular driver (step S120). In the selection of the circuit, an appropriate circuit may be selected based on the position information about the own vehicle and the map information from the map information database 82 of the navigation system 80, or a list of the circuits stored in the circuit information database 92 of the traveling line information storage device 90 may be displayed such that the selection is performed by the driver. The selection of the particular driver can be performed by displaying a list of the particular drivers for the selected circuit stored in the circuit information database 92 and causing the driver to perform the selection. When the particular driver is selected in this way, the traveling pattern of the particular driver for the selected circuit is set from the traveling patterns of the particular drivers for the circuits stored in the traveling pattern database 94 of the traveling line information storage device 90 (step S140), and the display of the image (hologram) of the traveling line corresponding to the set traveling pattern is started (step S150).

On the other hand, when "general road" is selected in step S100, a driver level is selected (step S130). The selection of the driver level can be performed, for example, by displaying "advanced driver", "intermediate driver", "beginning driver" and "recommended driver" and causing the driver to perform the selection. When the driver level is selected, the traveling pattern for the selected driver level is set (step S140), and the display of the image (hologram) of the traveling line corresponding to the set traveling pattern is started (step S150). The traveling pattern is set to the advanced-driver traveling pattern when "advanced driver" is selected, is set to the intermediate-driver traveling pattern when "intermediate driver" is selected, is set to the beginning-driver traveling pattern when "beginning driver" is selected, and is set to the recommended traveling pattern when "recommended driver" is selected.

After the display of the image (hologram) of the traveling line corresponding to the traveling pattern is started, a process described below is repeatedly executed until the display switching switch 44 is switched to the non-display of the traveling line.

In the repetitive process, first, the position information about the own vehicle is acquired by the GPS 24 and the like (step S160), and the traveling road information is acquired based on the position information about the own vehicle (step S170). In the case where the traveling road is a circuit, the traveling road information includes the course information (the form of the course, the state of the traveling road, the width of the traveling road, and the like) about the position of the own vehicle in the course of the selected circuit in the circuit information database 92. In the case where the traveling road is a general road, the traveling road information includes the map information (the road pavement state of the road, the width of the road, the number of lanes, the width of the sidewalk, the direction in which the vehicle can travel, the legal speed limit and the like in each section) about the position of the own vehicle in the map information database 82 of the navigation system 80.

Subsequently, the position of the driver's eyes is specified by analyzing the image photographed by the cabin camera 28 (step S180), and the traveling road image from the forward camera 26 is acquired (step S190). Next, the position of the own vehicle on the traveling road in the traveling road image is calculated by analyzing the traveling road image (step S200), and the display position of the traveling line corresponding to the traveling pattern is calculated based on the position of the own vehicle in the traveling road image and the position of the driver's eyes (step S210). Then, the holographic optical device 72 is controlled such that the image (hologram) of a traveling line 110 is displayed at the calculated display position on the windshield 74 by the holographic optical device 72 (step S220). Further, images (holograms) of points such as a sight point 112, a braking start point 114, a steering start point 116 and a gear shifting point 118 are displayed (step S230). It is determined whether the display of the traveling line is switched to the non-display by the display switching switch 44 and the display is ended (step S240). In the case where the display is continued, the process returns to step S160, and in the case where the display is ended, the traveling line display process is ended.

Figure 3:
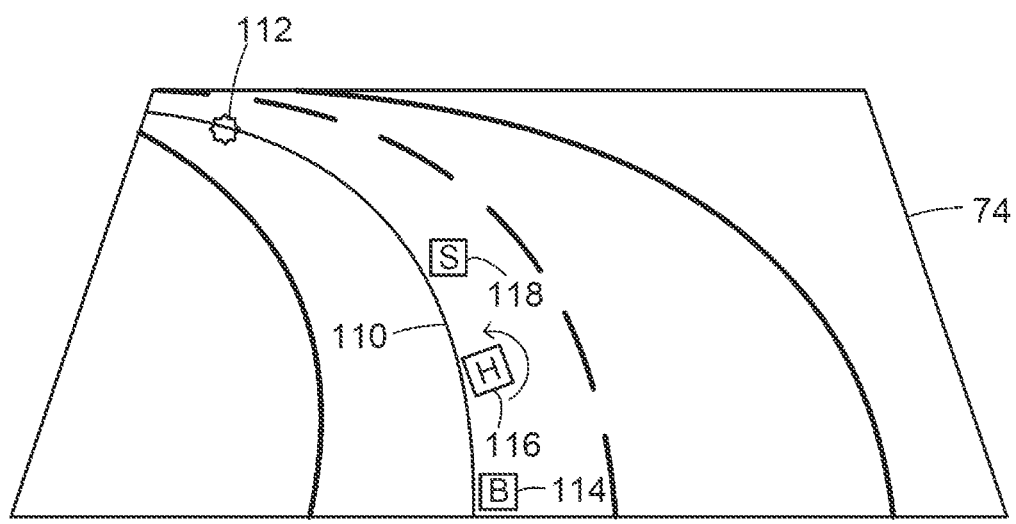
FIG. 3 is an explanatory diagram showing an exemplary state in which the display of an image (hologram) of a traveling line corresponding to a recommended traveling pattern is performed on a general road.

FIG. 3 is an explanatory diagram showing an exemplary state in which the display of the image (hologram) of a traveling line corresponding to a recommended traveling pattern is performed on a general road. In FIG. 3, the image (hologram) of the traveling line 110 is displayed on a road (thick solid lines and a thick broken line as a center line) that can be visually recognized through the windshield 74. In addition, the image (hologram) of the sight point 112 at a left back position, the image (hologram) of the braking start point 114 indicated by a mark that is constituted by "B" surrounded by a square, the image (hologram) of the steering start point 116 indicated by a mark that is constituted by "H" surrounded by a square and an arrow indicating a rotation direction, and the image (hologram) of the gear shifting point 118 indicated by a mark that is constituted by "S" surrounded by a square are displayed. The driver drives the vehicle along the displayed traveling line, and thereby can travel along the traveling line corresponding to the desired traveling pattern.

When the display switching switch 44 is switched to the display of the traveling line in a state where the automatic driving mode is selected by the mode switching switch 42, the steering device 70 is controlled such that the vehicle travels along the traveling line corresponding to the selected traveling pattern. On this occasion, in the case where the traveling road is a general road and where there is a leading vehicle, the vehicle speed may be set to a vehicle speed that is within the legal speed limit and that allows the vehicle to follow the leading vehicle, and in the case where the traveling road is a general road and where there is no leading vehicle, the vehicle speed may be set to a vehicle speed that is within the legal speed limit and that depends on the road situation. In the case of a circuit, the vehicle speed may be set to a vehicle speed at which the vehicle can safely travel.

In the automobile 20 according to the embodiment described above, the driver selects a desired traveling pattern from a plurality of traveling patterns, and the image (hologram) of the traveling line corresponding to the selected traveling pattern is displayed on the windshield 74. Thereby, it is possible to display the image (hologram) of the traveling line depending on the traveling road or driver's need.

In the automobile 20 according to the embodiment, in the case where the traveling road is a circuit, the image (hologram) of the traveling line corresponding to the selected particular-driver traveling pattern is displayed. In the case where the traveling road is not a circuit (the traveling road is a general road), one of the advanced-driver traveling pattern, the intermediate-driver traveling pattern, the beginning-driver traveling pattern and the recommended traveling pattern is selected, and the image (hologram) of the traveling line corresponding to the selected traveling pattern is displayed. However, the display of the image (hologram) of the traveling line may be prohibited in the case where the traveling road is not a circuit (the traveling road is a general road), while the display of the image (hologram) of the traveling line corresponding to the selected particular-driver traveling pattern is permitted in the case where he traveling road is a circuit, similarly to the embodiment. On this occasion, in the case where the traveling road is an expressway, the display of the image (hologram) of the traveling line may be permitted, even when the traveling road is not a circuit.

In the automobile 20 according to the embodiment, the driver selects a desired traveling pattern from a plurality of traveling patterns, and the image (hologram) of the traveling line corresponding to the selected traveling pattern is displayed. In addition to this, the traveling pattern may be selected depending on the state of the traveling road, and the image (hologram) of the traveling line corresponding to the selected traveling pattern may be displayed. The state of the traveling road includes a state of whether the traveling road is a paved road or an unpaved road, a state of whether the road surface is wet, a state of whether the road surface is covered by snow, a state of whether the road surface is frozen, and the like. On this occasion, in the case where the traveling road is a paved road and where the road surface is not wet, the selection of one of the advanced-driver traveling pattern, the intermediate-driver traveling pattern, the beginning-driver traveling pattern and the recommended traveling pattern may be permitted similarly to the embodiment. In the case where the traveling road is an unpaved road, a traveling pattern for unpaved roads may be selected. In the case where the road surface is wet, a traveling pattern for rain may be selected. In the case where the road surface is covered by snow, a traveling pattern for snowy roads may be selected. In the case where the road surface is frozen, a traveling pattern for frozen roads may be selected.

In the automobile 20 according to the embodiment, when the display switching switch 44 is switched to the display of the traveling line in the state where the automatic driving mode is selected, the steering device 70 is controlled such that the vehicle travels along the traveling line corresponding to the selected traveling pattern. However, when the automatic driving mode is selected, the image (hologram) of the traveling line is allowed not to be displayed.

In the automobile 20 according to the embodiment, the images (holograms) of the sight point 112, the braking start point 114, the steering start point 116 and the gear shifting point 118 are displayed in addition to the image (hologram) of the traveling line 110. However, some of the images (holograms) of the sight point 112, the braking start point 114, the steering start point 116 and the gear shifting point 118 may be displayed, an image (hologram) of a point or the like other than the points may be displayed, or the images (holograms) of the points are allowed not to be displayed.

The correspondence relation between principal elements of the embodiment and principal elements of the disclosure described in SUMMARY will be described. In the embodiment, the traveling line information storage device 90 and the navigation system 80 correspond to the "traveling road information storage device", the GPS 24 corresponds to the "traveling position detection device" the holographic optical device 72 and the windshield 74 correspond to the "display device", and the electronic control unit 50 corresponds to the "control device".

The correspondence relation between principal elements of the embodiment and principal elements of the disclosure described in SUMMARY does not limit the elements of the disclosure described in SUMMARY, because the embodiment is an example for specifically describing a mode for carrying out the disclosure described in SUMMARY. That is, the disclosure described in SUMMARY should be interpreted based on the description in SUMMARY, and the embodiment is just a specific example of the disclosure described in SUMMARY.

A mode for carrying out the present disclosure has been described above with use of the embodiment. However, the present disclosure is not limited to the embodiment at all. Naturally, the present disclosure can be carried out as various modes, without departing from the spirit of the present disclosure.

The present disclosure can be used in an automobile manufacturing industry and the like.

What is claimed is:

1. An automobile comprising:
    a traveling road information storage device that stores traveling road information;
    a traveling position detection device that detects a traveling position of a vehicle;
    a display device that displays an image in front of a driver; and
    a control device that controls the display device such that the display device displays an image of a traveling line in front of the driver, based on the traveling position and the traveling road information, wherein:
    the control device controls the display device such that the display device displays the image of the traveling line by switching among traveling lines corresponding to a plurality of traveling patterns;
    the traveling road information includes information about a particular traveling road;
    the plurality of traveling patterns includes traveling patterns of a plurality of particular drivers when the plurality of particular drivers drive on the particular traveling road; and
    the control device controls the display device such that the display device displays an image of a traveling line corresponding to a traveling pattern of a particular driver selected by a driver, in traveling on the particular traveling road, the traveling pattern of the particular driver selected by the driver being included in the traveling patterns of the plurality of particular drivers.

2. The automobile according to claim 1, wherein the control device controls the display device such that the display device displays an image of a traveling line corresponding to a traveling pattern selected by a driver, the traveling pattern selected by the driver being included in the plurality of traveling patterns.

3. The automobile according to claim 1, wherein:
    the traveling pattern includes at least one of a braking timing, a steering start timing and a gear shifting timing; and
    the control device controls the display device such that the display device displays an image of at least one of the braking timing, the steering start timing and the gear shifting timing together with the image of the traveling line.

4. The automobile according to claim 1, comprising an automatic driving device that performs automatic driving control, wherein
    the automatic driving device performs the automatic driving control such that the vehicle travels on a displayed traveling line, when automatic driving is selected.

5. The automobile according to claim 1, wherein the control device permits the display of the image of the traveling line when the vehicle travels on a predetermined traveling road, and prohibits the display of the image of the traveling line when the vehicle travels along a traveling road other than the predetermined traveling road.

6. The automobile according to claim 1, wherein the control device controls the display device such that the display device displays an image of a traveling line corresponding to a traveling pattern for a road condition, the traveling pattern for the road condition being included in the plurality of traveling patterns.

* * * * *